United States Patent [19]

Schimmel et al.

[11] Patent Number: 6,090,894
[45] Date of Patent: Jul. 18, 2000

[54] HYDROXY-FUNCTIONAL COPOLYMER BY REACTING EPOXY WITH ≧C8 MONOCARBOXYLIC ACID/DICARBOXYLIC ESTER COPOLYMER

[75] Inventors: Karl F. Schimmel, Verona; Suryya K. Das, Fox Chapel; Soner Kilic, Hampton Township, all of Pa.

[73] Assignee: PPG Industries Ohio, Inc., Cleveland, Ohio

[21] Appl. No.: 09/215,945

[22] Filed: Dec. 18, 1998

[51] Int. Cl.[7] .............................. C08F 8/14; C08F 20/04; C08L 33/02
[52] U.S. Cl. ................... 525/329.5; 525/163; 525/327.7; 526/318.3
[58] Field of Search ............................... 525/327.7, 329.5, 525/163; 526/318.3

[56] References Cited

U.S. PATENT DOCUMENTS

| | | | |
|---|---|---|---|
| 3,270,088 | 8/1966 | Hicks | 260/851 |
| 3,414,635 | 12/1968 | Edwards et al. | 260/851 |
| 3,804,814 | 4/1974 | Fassy et al. | 260/87.5 R |
| 3,838,087 | 9/1974 | Pirck et al. | 260/33.6 |
| 3,919,146 | 11/1975 | Emmons | 528/295.5 |
| 4,166,893 | 9/1979 | Kambanis et al. | 526/75 |
| 4,289,866 | 9/1981 | Ritz et al. | 526/320 |
| 4,528,318 | 7/1985 | Konishi et al. | 524/507 |
| 5,166,272 | 11/1992 | Burks et al. | 525/285 |
| 5,418,306 | 5/1995 | Shalati et al. | 526/329.1 |
| 5,418,307 | 5/1995 | Valpey, III et al. | 526/329.1 |
| 5,585,427 | 12/1996 | Schimmel et al. | 524/377 |
| 5,612,416 | 3/1997 | McCollum et al. | 525/123 |

FOREIGN PATENT DOCUMENTS

| | | |
|---|---|---|
| 1 159 990 | 1/1984 | Canada . |
| 3148022 | 6/1983 | Germany . |
| 75-3089 | 1/1975 | Japan . |
| 58-141249 | 8/1983 | Japan . |
| 60-110765 | 6/1985 | Japan . |

OTHER PUBLICATIONS

Journal of Polymer Science, vol. 48, pp. 279–289, Recent Developments in Polymerization by an Alternating Intra–Intermolecular Mechanism, 1960.

Maleic Anhydride by B. C. Trivedi and B. M. Culbertson, Plenum Press, New York and London, 1982.

Chemical Abstract, vol. 58, 14935b, Synthesis of Monoalkyl Maleates, 1959.

*Primary Examiner*—Robert E. Sellers
*Attorney, Agent, or Firm*—Dennis G. Millman

[57] ABSTRACT

A copolymer having utility in coating compositions comprises the addition polymerization product of an alpha-olefin monocarboxylic acid having at least 8 carbon atoms (particularly undecylenic acid) and a mono- or di-ester of an unsaturated dicarboxylic acid or anhydride (e.g., dialkyl maleat). The copolymer may be provided with hydroxy functionality by reacting the carboxylic acid functionality with an epoxy compound to permit use in curable coatings. Alternatively the copolymer may be base neutralized to serve as a surfactant in aqueous dispersion polymerization.

9 Claims, No Drawings

HYDROXY-FUNCTIONAL COPOLYMER BY REACTING EPOXY WITH ≧C8 MONOCARBOXYLIC ACID/DICARBOXYLIC ESTER COPOLYMER

BACKGROUND OF THE INVENTION

This invention involves improvements in a generally known type of copolymer that is formed by addition polymerization of alpha unsaturated monomers (including vinyl monomers, alpha-olefins, and acrylates) and esters of unsaturated dicarboxylic acids or anhydrides (typically maleic anhydride). When provided with hydroxyl functionality, this type of polymer has found utility in prior art coating compositions where they can be cured to form durable coatings by reaction with crosslinking agents that are reactive with hydroxyl groups, such as polyisocyanates, aminoplasts, or anhydrides. Alternatively, this type of polymer has been proposed for use as a polymeric dispersant or surfactant.

U.S. Pat. No. 3,270,088 (Hicks) discloses alkoxylating a half ester of maleic acid to produce a hydroxyalkyl ester monomer that is copolymerized with vinyl monomers that do not contain other reactive functional groups.

U.S. Pat. No. 3,414,635 (Edwards et al.) discloses reacting an unsaturated anhydride with a glycol ether, and the resulting half ester is then alkoxylated. The resulting hydroxyalkyl diester is copolymerized with vinyl monomers or acrylate monomers that do not contain other reactive functional groups.

U.S. Pat. No. 3,838,087 (Pirck) discloses copolymerizing maleic anhydride with a vinyl aromatic monomer, then opening the anhydride groups with alcohol and alkoxylating the remaining acid groups to form a hydroxyl group containing polymer.

U.S. Pat. No. 5,612,416 (McCollum et al.) discloses alkoxylating a half ester of maleic acid to produce a hydroxyl group containing monomer that is copolymerized with a combination of vinyl monomers and alpha-olefins, neither of which contain other reactive functional groups.

U.S. Pat. No. 5,585,427 (Schimmel et al.) discloses copolymerizing unsaturated diesters with various vinyl monomers, followed by transesterification of ester groups with hydroxy polyethers. The vinyl monomers do not include acid functionality. The product is useful as a dispersant for pigments in coating compositions.

U.S. Pat. No. 5,166,272 (Burks et al.) discloses copolymers of unsaturated anhydrides and alpha-olefins that have at least eight carbon atoms. The alpha-olefins used are selected from 1-decene, 1-dodecene, and undecenylic [sic] acid. The patent discloses base-neutralizing the anhydride groups on the polymer to permit dispersing the polymer in water.

Canadian Patent Specification 1,159,990 (Plum) discloses reacting unsaturated anhydrides with a polyhydric alcohol and a monoepoxy compound and then copolymerizing the resulting hydroxy diester with unsaturated monomers explicitly without carboxylic groups, particularly vinyl aromatic monomers and acrylate monomers.

U.S. Pat. No. 4,289,866 (Ritz et al.) is similar to the Canadian Patent above, with an additional step of further alkoxylating the alcohol ester group.

U.S. Pat. No. 5,418,306 (Shalati et al.) has as its objective the production of acid functional polymers. An unsaturated anhydride is copolymerized with a polyolefin, and the resulting anhydride polymer is reacted with alcohol to convert the anhydride groups to acid functional half esters.

U.S. Pat. No. 5,418,307 (Valpey et al.) is related to the above patent, with the additional step of hydrogenating the copolymer to produce a saturated product.

U.S. Pat. No. 4,166,893 (Kambanis et al.) copolymerizes a dimaleate having selected ester groups with a first acrylate and a second unsaturated monomer selected from other acrylates, vinyl acetate, and styrene.

SUMMARY OF THE INVENTION

It has now been found that useful alternating copolymers can be made by addition polymerization of a relatively long chain (at least 8 carbon atoms) olefinic acid, particularly undecylenic acid, with mono- or di-esters of unsaturated dicarboxylic acids (or the corresponding mono- or di-esters of unsaturated anhydrides). The resulting acid functional copolymers are useful as intermediates to produce various polymeric products that find utility, for example, in coating compositions.

One use of the copolymer intermediate involves imparting hydroxyl functionality to the copolymer by reacting the acid groups with an epoxy compound. Such hydroxyl functional polymers are useful in curable coating compositions when combined with conventional crosslinking compounds. The epoxy may be reacted with only the carboxylic group contributed by the undecylenic acid (in those embodiments in which the other monomer is a diester), with the acid groups contributed by both monomer types (in those embodiments in which monoesters of the dicarboxylic acid are used), or with the undecylenic acid prior to copolymerization. In each of these alternatives, the resulting polymer is characterized by regular placement of hydroxy groups along the polymer, which is considered advantageous in a curable coating composition for the sake of enhanced curing. Well-cured polymers usually result in coatings that are characterized by good mar resistance. Thus, another aspect of the invention comprises a curable coating composition containing the hydroxy functional copolymer of the invention with a crosslinking compound reactive with hydroxyl groups, such as a polyisocyanate, aminoplast, or anhydride type of crosslinking compound.

A second utility for the acid functional copolymer intermediates of the present invention entails their neutralization with a base. When neutralized to a sufficient extent to render the copolymers dispersible in water, it has been found that the base-neutralized copolymers of the present invention serve as excellent surfactants for use in aqueous dispersion polymerization. Particularly advantageous in this embodiment are copolymers of undecylenic acid and dialkyl maleates.

In another variation, instead of alkoxylating or neutralizing the acid groups of the copolymer intermediate, the acid groups may be esterified with a hydroxy group-containing polyalkyleneoxide. The product may serve as a polymeric dispersant in the manner disclosed in the aforesaid U.S. Pat. No. 5,585,427 (Schimmel et al.).

In yet another aspect of the invention, in those cases where a monoester of an unsaturated diacid is employed in the copolymerization, the copolymer may subsequently be heated to convert the half acid ester groups on the copolymer to anhydride groups. The resulting anhydride functional copolymer may be base neutralized for dispersion in water to serve as a polymeric surfactant for aqueous dispersion polymerization in the manner taught in the aforesaid U.S. Pat. No. 5,166,272 (Burks et al.)

DETAILED DESCRIPTION

One of the monomers included in the copolymer of the present invention is a monocarboxylic alpha-olefin having at least eight carbon atoms. Commercial availability of this class of monomers is essentially limited to undecylenic acid (10-undecenoic acid or 10-hendecenoic acid).

The other monomer for making the copolymer of the present invention may comprise monoesters or diesters of unsaturated dicarboxylic acids, as well as the monoesters or diesters of the corresponding anhydrides, including combinations thereof. Anhydrides have been preferred for the sake of their ability to form alternating copolymers with alpha-olefins, but in the present invention it has been found surprisingly that the mono- or di-esters are able to form alternating copolymers with undecylenic acid. Dialkyl maleates are preferred due to their availability, but other substituted or unsubstituted monoesters or diesters of other unsaturated dicarboxylic acids may be used. These acid include, for example, fumaric acid, citraconic acid, 2,3-dimethyl maleic anhydride, chloro maleic anhydride, dichloro maleic anhydride, and itaconic anhydride. Any unsaturated anhydride having alkyl, aryl, or other substitution may serve the same purpose.

Any alkyl, cycloalkyl, aryl, or alkaryl alcohol may serve to open the anhydride ring in the first stage of the esterification to form the mono- or di-ester monomers used in the copolymerization of the present invention. Since the primary function of this alcohol is merely to open the anhydride, a wide selection of alcohols and phenols may be used. Ether alcohols may also be used. The use of simple alcohols is preferred, particularly methanol or ethanol because the presence of larger alkyl groups in the mono- or di-ester monomers tends to slow the copolymerization reaction. Maleic anhydride is a particularly convenient starting material, whereby the mono- or di-esters are mono- or di-alkyl maleates (or fumarates), particularly dimethyl maleate, diethyl maleate, dibutyl maleate, dibutyl fumarate, dibenzyl fumarate, ethyl methyl maleate, and the like.

Alkoxylating the monoester to a diester is an option that may be used to provide additional hydroxy functionality to the copolymer. This may be accomplished by reaction with an epoxy compound, particularly an alkylene oxide such as ethylene oxide or propylene oxide. The use of propylene oxide is preferred because it forms a 2-hydroxy group in the ester group. Materials containing glycidyl groups may also be used to open the anhydride, such as alkyl o aryl glycidyl ethers (e.g., butyl glycidyl ether, phenyl glycidyl ether).

In preferred embodiments, the monomers from which the copolymer is produced consist essentially of the unsaturated olefinic acid and the mono- or di-esters described above. This is particularly preferred if uniform distribution of groups along the copolymer chains is desired. In other embodiments, one or more additional unsaturated monomers may be included, and these may be selected from alpha-olefins, vinyl aromatics, acrylate or methacrylate monomers, allyl compounds, vinyl ethers, vinyl esters, vinyl acetals, and mixtures thereof.

Alpha-olefins useful as the optional third co- monomer include the lower alpha-olefins, that is, materials with a carbon chain length of less than 20, preferably those with 2 to 12 carbon chain length, most preferably 4 to 10. Carbon chain lengths below 6 may be used, but are not as convenient because they usually entail use of a pressure reactor. Carbon chain lengths above 10 may be used, but are not preferred because they are not as easily handled during processing. Specific examples include ethylene, propylene, isobutene, diisobutylene, 1-hexene, 1-octene, and 1-decene, and mixtures thereof, with the preferred materials being 1-hexene and 1-octene. Cycloaliphatic olefins are also suitable and include, for example, cyclobutene, cyclopentene, 1-methylcyclopropene, methylenecyclopentene, cyclohexene, cycloheptene, cyclooctene, and mixtures thereof.

Vinyl compounds useful as the optional third co-monomers may be chosen from aromatic vinyl monomers, preferably styrene, also including substituted styrene compounds. Examples of alpha-substituted vinyl aromatic compounds include vinyl toluene, alpha-methylstyrene, p-isopropyl-alpha-methylstyrene, p-isopropylstyrene, p-methoxy-alpha-methylstyrene, p-methoxystyrene, p-chloro-alpha-methylstyrene, p-chlorostyrene, p-fluoro-alpha-methylstyrene, p-fluorostyrene, p-dimethylamino-alpha-methylstyrene,p-dimethylaminostyrene, and the like. Beta-substituted styrene compounds can also be used, such as stilbene, beta-methylstyrene, beta-chlorostyrene, beta-methoxymethylstyrene, beta-methoxystyrene, beta-n-butoxystyrene, beta-isobutoxystyrene, beta-tert-butoxystyrene, p-methoxy-beta-methylstyrene, p-methyl-(beta-methylstyrene), p-chloro-beta-methylstyrene, and the like.

Another class of vinyl monomers that may be used as the optional third co-monomer are vinyl ethers, which may contain alkyl, aryl or cycloaliphatic groups with a carbon chain length of 1 to 20. Specific examples of vinyl ethers include alkyl vinyl ethers such as methyl, ethyl, isopropyl, 2-ethylhexyl, n-butyl, isobutyl, tert-butyl, 2-chloroethyl, benzyl vinyl ethers, and mixtures thereof. Also suitable are aryl vinyl ethers including methyl propenyl ether (both cis and trans isomers), phenyl vinyl ether, and mixtures thereof. Additionally, 2-phenylvinyl alkyl ethers or thioethers having a carbon chain length not exceeding about 6 wherein the alkyl group can be either straight-chain or branched can be used. Suitable cycloaliphatic vinyl ethers include cyclopentyl and cyclohexyl vinyl ethers, and mixtures thereof. Additional examples of suitable vinyl ether monomers include divinyl ether, 1,2-dimethoxyethylene, p-dioxene, and conjugated dihydroanisole, and mixtures thereof. Information regarding copolymerization of vinyl ethers may be found in J. Poly. Sci., Vol. 48, page 279 (1960) and in *Maleic Anhydride* by B. C. Trivedi and B. M. Culbertson (Plenum Press, New York and London, 1982).

The optional third co-monomer may also be selected from allyl compounds including allylbenzene, 2-allylphenol, alpha-allylnaphthalene, 3-allylcyclopentene and mixtures thereof. Functionalized allyl compounds bearing functional groups including hydroxyl, amino, cyano, carboxyl, silane, phosphonate, epoxy and ether moieties include allyl alcohol, methallyl alcohol, 2-phenylallyl alcohol, 2-methylene propanediol, 1,1-dimethylallyl alcohol, methallylamine, N-allylacetamide, allyl acetate, trimethylallylsilane, and diethyl acetonyallylphosponate, N-allylamidazole, 2-allylpyrrole and mixtures thereof. When an ether group is present on the allyl compound, the ether group can be a functionalized or non-functionalized alkyl, aryl, or cycloaliphatic species. Specific examples include allyl glycidyl ether, heptafluoroisopropyl allyl ether, heptafluoroisopropyl methallyl ether, allyl acetone, methallylacetone, 2-allylcyclohexanone, 1-phenyl-4-pentene-1-one, diallyl ether, and mixtures thereof.

The undecylenic acid and the mono- or di-ester monomer components described above characteristically react to produce an alternating copolymer rather than a random copolymer. When synthesizing the alternating copolymer, it is preferred to discourage the formation of repeating units of a monomer. Additionally, it may be desirable to control the molecular weight of the alternating copolymer. Typically, this is achieved by "starving" the reaction, that is, by adding an amount of initiator to the diester prepared above, then slowly and continuously adding additional initiator and the vinyl co-monomer component to the reaction vessel at a controlled rate such that self-polymerization of the alpha-olefin monomer component is discouraged. When this procedure is followed, it is believed that the reaction product is predominantly an alternating polymer represented by the structural formula $(A_xB_y)_m$, where A represents a single unit comprising a mono- or di-ester, B represents a single unit comprising an alpha-olefin monomer, x and y are equal to 1, and m is an integer larger than 1. In other words, the formation of alternating copolymers where either x or y, or where both x and y, are integers larger than 1 is discouraged. It is theoretically possible that some portions along the copolymer chain contain repeating units of alpha-olefin monomer; however, it is believed that these areas may be essentially eliminated by adjusting the feed rates of the initiator and the vinyl monomer component. Minor amounts of repeating units may not have a perceptible effect on the results, and therefore may be tolerated.

After all the monomer feeds been added, the reaction mixture is usually held at the reaction temperature for a period of time ranging from about 30 minutes to about 8 hours, preferably from about 60 minutes to about 90 minutes, to ensure the reaction is complete. The resultant copolymer solution generally has solids content, determined at 110° C. for 60 minutes, of from about 40 percent to about 95 percent, preferably from about 60 percent to about 80 percent by weight.

The copolymer of the present invention generally has a number-average molecular weight of from about 1,000 to about 100,000, preferably from about 1,000 to about 5,000, more preferably from about 1,500 to about 3,500 as measured by gel permeation chromatography using polystyrene as standard.

In those embodiments in which the copolymer intermediate is converted to a hydroxy functional polymer for use in a curable polymer system, carboxyl functionality on the copolymer is reacted with an epoxy compound. Preferably the epoxy reaction is primary with carboxyl groups derived from the undecylenic acid component and is carried out after copolymerization. Alternatively, the undecylenic monomer may be reacted with an epoxy compound prior to copolymerization. When diester monomers are used, the acid functionality of the undecylenic groups constitutes the entire acid functionality of the copolymer. But in those embodiments in which monoesters of dicarboxylic acids are used as comonomers, the remaining half acid groups will also react with the epoxy compounds. This step of reacting some or all of the carboxyl groups on the copolymer with epoxy provides hydroxy functionality to the copolymer, which provides crosslinking sites for subsequent curing reactions. The epoxy compounds that may be used include alkylene oxides such as ethylene oxide or propylene oxide, as well as materials containing glycidyl groups, such as alkyl or aryl glycidyl ethers (e.g., butyl glycidyl ether, phenyl glycidyl ether). Preferred for use in curable coating compositions are monoepoxides having substantial hydrocarbon chain length, such as commercially available epoxidized alpha olefins, which may include alkyl groups having at least 6 carbon atoms, preferably at least 8 carbon atoms, optionally in a branched structure. Polyepoxides such as certain of the commercially available family of EPON products may be used if partially defunctionalized to form monoepoxides. Epoxies with little or no aromatic content are preferred for automotive coatings. Preferably, the glycidyl compound itself includes an ester group, such as CARDURA E (a glycidyl ester of Versatic acid sold by Shell Chemical Company). Versatic acid is a proprietary, synthetic blend of isomers of saturated tertiary alkyl monoacid having nine to eleven carbon atoms in a branched arrangement.

In an alternative embodiment, the copolymer intermediate of the present invention is not reacted with an epoxy, but rather with a hydroxy polyether compounds to esterifying the undecylenic acid groups on the copolymer. The product may serve as a low acid content polymeric dispersant, such as used to disperse pigments in colored coating composition. The hydroxy polyethers are preferably polyethylene glycols of the structure:

R—O—(CH$_2$CH$_2$O)$_n$CH$_2$CH$_2$OH where n is 1 to 20 and R is a substituted or unsubstituted alkyl, cycloalkyl, or aryl group with a carbon chain length of 1 to 20. Preferably R is a methyl group, and n is chosen such that the glycol has a number average molecular weight of about 100 to 3,000 (gel permeation chromatography, polystyrene standard). Materials of this type are commercially available from Union Carbide and Chemicals under the name CARBOWAX.

In another aspect of the invention, the undecylenic acid functionality of the copolymer intermediate may be base neutralized and dispersed in water, whereby the resulting salt has been found to be highly effective as a surfactant for use in aqueous dispersion polymerization of other polymerizable monomers. Neutralization may employ basic materials as are well known in the art, such as alkali hydroxides, alkali carbonates, alkali acetates, ammonium hydroxide, ammonium carbonate, ammonium acetate, alkyl amines, and alkyl, aromatic or cycloaliphatic amino alcohols. Particularly useful are the dialkanolamines. The resulting polymeric surfactants are particularly effective when the copolymer has been made from unsaturated dialkyl esters and undecylenic acid. In this preferred class of copolymers, the hydrophilic carboxylate groups are pendant at the end of the relatively long chain residues of the undecylenic acid groups, remote from the relatively hydrophobic polymer backbone. It is believed that this greater separation between hydrophilic and hydrophobic moieties compared to conventional polycarboxylate polymeric surfactants yields improved performance in aqueous dispersion polymerization.

In another variation, some embodiments of the copolymer intermediate of the present invention can be converted to an anhydride functional polymer. In this embodiment, the copolymer comprises the polymerization product of olefinic acid and an monoester of an unsaturated dicarboxylic acid, preferably a monoalkyl maleate. Following copolymerization, holding the product at an elevated temperature reconverts the half ester/acid group to an anhydride group. The product can then be base neutralized by basic materials as described above. The base-neutralized materials may be dispersed in water, where they may serve, for example, as polymeric emulsifiers for carrying out aqueous dispersion polymerizations.

The hydroxy functional copolymers of the preferred embodiments of the present invention are useful as film-forming binders for coating compositions when combined with a curing agent. Typical crosslinking compounds well known to those skilled in the art as curing agents include, isocyanates, aminoplasts such as melamine-formaldehydes and benzoguanamines, and anhydrides. The coating composition may be a one-package composition, in which case the curing agent is heat-activated, such as a blocked isocyanate or the aminoplasts. Alternatively the coating compositions may be two-package, room temperature curing compositions, wherein the hydroxy functional copolymer is contained in one package and the curing agent, e.g., a polyisocyanate, is contained in a separate package. Optionally, a third package may additionally be employed comprising a viscosity reducer. The separate packages are blended immediately prior to application of the coating composition onto a substrate. The ability to form a durable, mar resistant coating having good appearance at or only slightly above room temperature is particularly useful for automotive refinish applications. The coatings of the present invention may be clear or colored, and may serve as primers, base coats, or topcoats.

If the coating composition is to be a colored coating, it may include a pigment component of a known type. The pigment component can contain inorganic, organic, metallic, metallic-effect, filler and anti-corrosive pigments, and mixtures thereof. Suitable inorganic pigments include titanium dioxide, iron oxide, lead chromate, chrome green, cadmium sulfide, lithopone pigments, and the like. Suitable organic pigments include carbon black; monoazo, diazo, and benzimidazolone yellows, oranges, reds, and browns; phthalocyanine blues and greens; anthraquinone pigments ranging from yellow to blue; quinacridone yellows, reds and violets; perylene reds and browns; indigoid reds, blues, and violets; thioindigo violets; isoindolinone yellows, oranges and reds; quinoline yellows, and the like. Suitable metallic and metallic-effect pigments include aluminum, zinc, lead, bronze, copper, stainless steel and mica flake, and the like. Suitable filler pigments include magnesium silicate clays, fumed or precipitated silicas, barytes, blanc fixe, china clay, and the like. Suitable anti-corrosive pigments include lead oxide, zinc chromate, zinc phosphate, micaceous iron oxide, and the like. Mixtures containing any of the pigments described above are also suitable.

Optionally, the coatings may further contain a diluent. The diluent serves to reduce the viscosity of the dispersion and to assist in pigment wetting. Typically, the diluent comprises an organic solvent. Suitable organic solvents include ketones such as methyl isobutyl ketone, methyl ethyl ketone, diisobutyl ketone, and the like; esters such as butyl acetate, isobutyl acetate, pentyl propionate, and the like; alcohols such as methanol, ethanol, propanol, butanol, isobutanol, and the like; or glycol ethers such as the monoalkyl ethers of ethylene glycol, diethylene glycol, or propylene glycol, and the like.

Although organic solvents are the preferred diluents, suitable alternative diluents include nonreactive oligomeric or polymeric materials with a viscosity ranging from about 20 centipoise to about 1,000 centipoise as measured with a Brookfield viscometer at about 72° F. (22° C.) and a glass transition temperature lower than about 35° C. as measured by any of the common thermal analytical methods well understood by those skilled in the art. Specific examples include plasticizers such as tributyl phosphate, dibutyl maleate, butyl benzyl phthalate, dibutyl benzyl phthalate and mixtures thereof.

Mixtures of organic solvents or mixtures of organic solvents with the nonreactive oligomeric or polymeric diluents may also be used, provided there is no phase separation when the diluents are mixed with the copolymer of the present invention. When present, the diluent is generally used at a level of from about 0.1 percent to about 500 percent, preferably from about 20 percent to about 400 percent, more preferably from about 50 percent to about 200 percent by weight, the percentages based on the weight of solids (resin and pigment) present in the composition.

Optionally, the coatings may contain an auxiliary polymer. The purpose of the auxiliary polymer is to modify the properties of the coating composition. For example, it is often desirable to increase the solids level of a pigment dispersion or a coating composition without producing a large increase in viscosity. Or it may be desirable to modify the pigment wetting characteristics of the vehicle used to prepare the pigment dispersion. Similarly, it is often desirable to modify certain physical properties of the coating composition to which the pigment dispersion is subsequently added, for example the appearance, gloss, humidity resistance, mar resistance or chemical resistance of the cured film. A variety of materials are suitable for use as the auxiliary polymer. These include, but are not limited to, acrylic polymers, polystyrene polymers, acrylonitrile polymers, polyester polymers, epoxy polymers, polyamide polymers, butadiene polymers, polyalkylene polymers, polyalkylene glycol polymers, aminoplast resins, polyurethane polymers, polysilane polymers, polysiloxane polymers, and the like. Additionally, the auxiliary polymer may contain functional groups including but not limited to hydroxyl groups, carboxyl groups, amino groups, epoxy groups, phosphate groups, and the like. Mixtures of auxiliary polymers are also appropriate. Methods for preparing such auxiliary polymers are well understood by those skilled in the art of polymer chemistry, and need not be described in further detail here. When present, it is preferred that the auxiliary polymer be present at a level of from about 0.10 percent to about 100 percent, preferably from about 1 percent to about 50 percent, more preferably from about 2 percent to about 25 percent by weight, the percentages based on the weight of solids of the primary film-forming polymer present in the composition.

The coating compositions may contain other optional ingredients, for example, anti-settling additives, pigment wetting additives, gassing inhibitors, corrosion inhibitors, anti-foaming additives, surface tension modifiers, mildewcides, rheology modifiers, waxes, metal passivators, UV light absorbers, anti-oxidants, UV light stabilizers, and the like. When present, these additives are generally used at a level of from 0.01 percent to 5 percent by weight, the percentages based on the weight of total solids in the composition, although the amounts may vary according to particular application.

The coating composition can contain other optional ingredients, such as inorganic or organic acids or bases and the like. When present, these materials are generally used at a level of from about 0.01 percent to about 50 percent, preferably from about 0.10 percent to about 5 percent by weight, the percentages based on the weight of the film-forming polymer used in the coating composition.

The coating compositions of the present invention may be applied to any of the various substrates to which they adhere, particularly metal or plastic. Optionally, the substrate may have been previously coated with a primer coating composition. The compositions can be applied by conventional means, including brushing, dipping, flow coating, spraying and the like, but preferably, they are applied by spraying. The usual spray techniques and equipment for air-spraying can be used.

EXAMPLES

The following examples illustrate several embodiments of the present invention for the sake of describing the best mode of the invention, but it should be understood that the scope of the invention is not limited to these particular embodiments. Examples 1 through 4 set forth variations in the synthesis of preferred embodiments of the acid functional copolymer intermediates of the invention and their conversion to hydroxy functional copolymers. Example 1 additionally includes description of a curable coating compositions incorporating the copolymer. Example 5 demonstrates the conversion of the copolymer intermediate to a polyether-containing dispersant. Example 6 shows an embodiment which employs a third monomer to product an alternative embodiment of copolymer intermediate. Example 6 also demonstrates reconverting monoester groups on the copolymer to anhydride functionality. The alternative procedure of alkoxylating undecylenic acid prior to copolymerization is shown in Example 7. Example 8 shows a preferred copolymer synthesis and its subsequent base neutralization and dispersion in water to produce a polymeric surfactant.

EXAMPLE 1

The following initial charge and feeds were used in the preparation of an undecylenic acid/diethyl maleate copolymer, which was then converted to a hydroxyl functional polymer by reacting acid groups of the copolymer with a glycidyl compound (Cardura E).

| Ingredients | Parts by Weight |
| --- | --- |
| Initial Charge | |
| Diethyl maleate | 86.0 |
| Undecylenic acid | 92.0 |
| Feed 1 | |
| n-Butyl acetate | 20.1 |
| Ditertiarybutyl peroxide | 3.6 |
| Feed 2 | |
| Cardura E | 125.0 |

The initial charge was heated in a reactor with agitation to 150° C. Then Feed 1 was added in a continuous manner over a period of one hour. At the completion of Feed 1, the reaction mixture was held at 150° C. for 5 hours. Following the polymerization, the reaction mixture was cooled to 70° C., Feed 2 was added, and the mixture was reheated to 150° C. to react acid groups with glycidyl groups. After holding for 4 hours and 15 minutes at 150° C., the experimental acid value was determined as 0.2 mg KOH/gram of polymer solution, and the reaction mixture was cooled to room temperature.

The resultant polymer (7.6 parts by weight) was mixed with CYMEL-327 (2.9 parts by weight), a partially methylated melamine formaldehyde condensate with imino content in butanol available from Cytec Industries, and CYCAT-4040 (0.12 parts by weight), a 40 percent solution of paratoluene sulfonic acid in isopropanol available from Cytec Industries. The mixture was reduced to 70 percent resin solids using n-butyl acetate. The mixture was drawdown on a glass plate at a wet film thickness of 8 mils and baked at 285° F. for 30 minutes to provide a clear and smooth hard film.

For curing with blocked polyisocyanates, 5.8 parts by weight of the hydroxy functional copolymer described above was mixed with 2.7 parts by weight of DESMO-DUR® BL-4165 (65 percent solids of methylethyl ketone oxime blocked isophorone diisocyanate available from Bayer Corp. in AROMATIC® 100, available from Exxon Chemical Company), 0.04 parts by weight dibutyltin dilaurate. The mixture was reduced to 70 percent resin solids using n-butyl acetate. The mixture was drawdown on a glass plate at a wet film thickness of 8 mils blade and baked at 285° F. for 30 minutes to provide a clear and smooth film which was softer than the melamine cured film.

EXAMPLE 2

The following initial charge and feed were used in the preparation of a undecylenic acid/diethyl maleate copolymer in a manner similar to that of Example 1, with the exception that in this example the addition time of Feed 1 was extended to 4 hours, and the reaction was carried out under reflux.

| Ingredients | Parts by Weight |
| --- | --- |
| Initial Charge | |
| Diethyl maleate | 1210.50 |
| Undecylenic acid | 1294.85 |
| Feed 1 | |
| n-Butyl acetate | 282.89 |
| Ditertiarybutyl peroxide | 50.66 |

The initial charge was heated in a reactor with agitation to the reflux temperature (167° C.). Then Feed 1 was added in a continuous manner over a period of 4 hours. At the completion of Feed 1, the reaction mixture was held at 150° C. for 5 hours. Following the polymerization, the reaction mixture was cooled to room temperature to yield a product at 82.1 weight percent solids and a number average molecular weight of 2060 as determined by gel permeation chromatography (GPC) using polystyrene as standard. The resin had an acid value of 131.8 mg KOH/gram of polymer solution and a Gardner-Holdt viscosity measured at 25° C. of Z3+.

To convert the acid functional copolymer to hydroxy functionality, to an initial charge of 2218.3 grams of the copolymer prepared above, 1375.0 grams of Cardura E was added. Then the reaction mixture was heated to 150° C. and held there for about 12 hours for the completion of the reaction between acid and glycidyl groups. The final resin had a resin content of 89.8 weight percent, an experimental acid value of 0.71 mg KOH/gram of polymer solution, and an experimental epoxy equivalent weight of 68646.3 grams of polymer solution.

EXAMPLE 3

The following initial charge and feed were used in the preparation of undecylenic acid/dimethyl maleate copolymer in a manner similar to that of Example 2, with the exception that diethyl maleate in the initial charge was replaced with dimethyl maleate.

| Ingredients | Parts by Weight |
| --- | --- |
| Initial Charge | |
| Dimethyl maleate | 1080.00 |
| Undecylenic acid | 1380.00 |

-continued

| Ingredients | Parts by Weight |
| --- | --- |
| Feed 1 | |
| n-Butyl acetate | 279.33 |
| Ditertiarybutyl peroxide | 54.00 |

The initial charge was heated in a reactor with agitation to the reflux temperature (167° C.). Then Feed 1 was added in a continuous manner over a period of 4 hours. At the completion of Feed 1, the reaction mixture was held at 150° C. for 5 hours. Following the polymerization, the reaction mixture was cooled to room temperature to yield a product at 82.0 weight percent solids and a number average molecular weight of 1988 as determined by gel permeation chromatography (GPC) using polystyrene as standard. The resin had an acid value of 143.0 mg KOH/gram of polymer solution and a Gardner-Holdt viscosity measured at 25° C. of Z5+.

To convert the acid functional copolymer to hydroxy functionality, to an initial charge of 2048.0 grams of the polymer prepared above, 1375.0 grams of Cardura E was added. Then the reaction mixture was heated to 150° C. and held there for about 12 hours for the completion of the reaction between acid and glycidyl groups. The final resin had a resin content of 89.8 weight percent, an experimental acid value of 0.53 mg KOH/gram of polymer solution, and an experimental epoxy equivalent weight of 73770.9 grams of polymer solution.

EXAMPLE 4

The following initial charge and feed were used in the preparation of a hydroxyl functional copolymer by reacting acid groups of undecylenic acid with glycidyl groups of Cardura E during copolymerization of undecylenic acid with dibutyl maleate.

| Ingredients | Parts by Weight |
| --- | --- |
| Initial Charge | |
| n-Butyl acetate | 62.5 |
| Cardura E | 250.0 |
| Feed 1 | |
| Dibutyl maleate | 228.0 |
| Undecylenic acid | 184.0 |
| Ditertiarybutyl peroxide | 16.4 |
| n-Butyl acetate | 47.0 |

The initial charge was heated in a reactor with agitation to 150° C. Then Feed 1 was added in a continuous manner over a period of 4 hours. At the completion of Feed 1, the reaction mixture was held at about 150° C. for 5 hours. Then the reaction mixture was cooled to room temperature to yield a product of 79.4 weight percent solids and a number average molecular weight 2567 as determined by gel permeation chromatography (GPC) using polystyrene as standard.

EXAMPLE 5

In this example undecylenic acid is copolymerized with dimethyl maleate followed by esterification with a methyl capped polyethylene oxide mono hydroxy compound to make a surfactant or dispersant. The polyethylene oxide was CARBOWAX® 350 (from Union Carbide) having the structure $CH_3$—$(OEt)_n$—$OH$ where n has an average value of about 7.2.

To a 3 liter flask equipped with a condenser, thermometer, addition funnels and nitrogen sparge line was added 920 grams (5 moles) of undecylenic acid. With a light sparge, this was heated to 140° C. and held. The initiator, di-t-amyl peroxide, and dimethyl maleate, were added in as follows. The initiator was added to the flask over 2 hours. The initiator feed was started 10 minutes before the monomer feed, which was added over 1.5 hours. After completion of the feed, the solution was held 1 hour at temperature. A sample was taken at this point and the solids were 88.8%, the acid value was 168, and the Gardner Holdt viscosity was greater than Z6. The solution was heated to 150° C. and a mixture of 525 grams (1.5 moles) of CARBOWAX 350, 5 grams of triisodecylphosphite and 5 grams of dibutyltinoxide was added, and water was removed.

EXAMPLE 6

In this example, both undecylenic acid and 1-octene were used as the alpha-olefins along with a half acid ester of maleic anhydride to yield an alternating copolymer of acid ester and alpha-olefin, the alpha-olefin portions being randomized undecylenic acid and 1-octene. On further heating, the half acid ester was reconverted to the anhydride.

To a 2 liter 4 neck flask with a condenser, stirrer, temperature controlling thermocouple and addition funnels were added 44.8 grams (0.4 mole) of 1-octene and 184 grams of undecylenic acid (1.0 mole). This mixture was heated with a nitrogen sparge to 75° C. to remove oxygen, then a nitrogen cap was used throughout the reaction. The olefin mixture was stabilized at 88°–89° C. during the additions of initiator and monomer. The initiator was t-amyl peroxy-2-ethyl hexoate, which was included in the amount of 184 grams (0.8 moles). The maleic half acid ester was prepared by reacting 196 grams of maleic anhydride (2 moles) with 92 grams ethanol (2 moles). To keep the product of the maleic anhydride and the ethanol homogeneous 46 grams (1 mole) of ethanol was added.

The polymerization was carried out as follows. The initiator was added over 4 hours beginning 10 minutes before beginning the addition of the maleic acid ester solution in ethanol, which was added over 3.5 hours. At the completion of the additions, the reaction was held 1 hour at 88–89° C. The solution polymer at this point had a viscosity greater than Gardner Holdt Z6. Solvent and unreacted olefin were removed by distillation with a nitrogen sparge at a maximum temperature of 150° C. This removed the unreacted olefin and reconverted the succinyl half acid ester to anhydride.

EXAMPLE 7

The following is an example of a procedure for alkoxylating undecylenic acid monomer.

Into a pressure vessel that had been purged with nitrogen and evacuated with vacuum, 2506 grams of undecylenic acid, 8.6 grams of triphenyl phosphine, and 625.3 grams of n-butyl acetate were charged. The vessel was agitated, heated to 120° C., purged again with nitrogen, and charged with 850 grams of propylene oxide over a period of one hour. The reaction temperature was controlled so as to not exceed 125° C. When acid value reached 1 or less, the reaction vessel was cooled to 60° C. and the contents transferred to a flask where excess propylene oxide was removed by vacuum distillation at a maximum temperature of 210° C.

The propoxylated undecylenic acid product may then be used in place of undecylenic acid in the copolymerization procedures of any of the foregoing examples.

EXAMPLE 8

The following initial charge and feed were used in the preparation of an undecylenic acid/diethyl maleate polymer in a manner similar to that of Example 2.

| Ingredients | Parts by Weight |
| --- | --- |
| Initial Charge | |
| Diethyl maleate | 859.9 |
| Undecylenic acid | 919.9 |
| Feed 1 | |
| n-Butyl acetate | 200.1 |
| Ditertiarybutyl peroxide | 36.0 |

The product obtained had 86.5 weight percent solids and a number average molecular weight of 2433 as determined by gel permeation chromatography (GPC) using polystyrene as standard. The resin had a Gardner-Holdt viscosity measured at 25° C. of Z5+. A surface active copolymer was obtained by neutralizing this polymer with N,N-dimethylethanolamine and distilling off the organic solvent by azeotropic distillation. To prepare the surface active copolymer, to an initial charge of 1816.0 grams of the polymer prepared above, 423.0 grams of N,N-dimethylethanolamine was added with agitation over 15 minutes while heating the reaction mixture from room temperature to 60° C. Then the reaction mixture was held at 60° C. for 10 minutes before adding 5130.0 grams of deionized water to the reaction vessel over 20 minutes. The system was converted for azeotropic distillation at which point the temperature of the reaction mixture was 47° C. Distillation continued at atmospheric pressure until there was no longer any phase separation in the distillate collecting trap. The final aqueous resin had a resin content of 21.3 weight percent and a pH of 8.6.

The invention has been described with reference to particular embodiments for the sake of disclosing the best mode of the invention, but it should be understood that other variations and modifications as would be known to those of skill in the art may be resorted to without departing from the scope of the invention as defined by the claims.

What is claimed is:

1. A copolymer comprising the polymerization product of (a) an alpha-olefin monocarboxylic acid having at least 8 carbon atoms and (b) a mono- or di- ester of an unsaturated dicarboxylic acid, or a mono- or di- ester of an unsaturated anhydride, wherein the copolymer is provided with hydroxy functionality by reaction of an epoxy compound with carboxylic acid functionality of the copolymer.

2. The copolymer of claim 1 wherein the epoxy compound is a glycidyl ester of an alkyl group.

3. The copolymer of claim 2 wherein the alkyl group of the glycidyl ester is a branched alkyl group having at least 8 carbon atoms.

4. The copolymer of claim 1 wherein monomer (b) is a dialkyl ester of an unsaturated dicarboxylic acid free from hydroxyl groups.

5. The copolymer of claim 4 wherein monomer (b) is a dialkyl maleate.

6. The copolymer of claim 5 wherein monomer (a) comprises undecylenic acid.

7. The copolymer of claim 2 wherein monomer (a) comprises undecylenic acid.

8. The copolymer of claim 1 which is the polymerization product of an additional unsaturated monomer (c) different from (a) and (b).

9. The copolymer of claim 8 wherein the unsaturated monomer (c) is selected from the group consisting of alpha-olefins, styrene, substituted styrenes, vinyl ethers, allyl compounds, and mixtures thereof.

* * * * *